(12) United States Patent
Moreira et al.

(10) Patent No.: US 6,464,812 B1
(45) Date of Patent: Oct. 15, 2002

(54) PROCESS OF MANUFACTURING TROPHIES, MEDALS AND AWARD PLATES, MADE OF POLYESTER, ESTERVINYLIC OR EPOXY RESINS, REINFORCED WITH FIBERGLASS

(76) Inventors: Erlei Moreira, Rua Roberto Carlos de Almeida Cunha, 395, Bairro Floramar, CEP-31760-000 Belo Horizonte, MG (BR); Ana Maria Do Carmo Magalhães, Rua roberto Carlos de Almeida Cunha, 395, Bairro Floramar, CEP-31760-000 Belo Horizonte, MG (BR)

( * ) Notice: Subject to any disclaimer, the term of this patent is extended or adjusted under 35 U.S.C. 154(b) by 123 days.

(21) Appl. No.: 09/554,313
(22) PCT Filed: Dec. 14, 1998
(86) PCT No.: PCT/BR98/00113
§ 371 (c)(1), (2), (4) Date: Jul. 12, 2000
(87) PCT Pub. No.: WO99/32006
PCT Pub. Date: Jul. 1, 1999

(30) Foreign Application Priority Data

Dec. 19, 1997 (BR) .............................................. 9705783

(51) Int. Cl.[7] .................. B32B 27/36; B32B 27/38; B32B 31/12
(52) U.S. Cl. .................. 156/181; 156/247; 156/267; 156/305; 156/307.4; 156/307.7
(58) Field of Search .................. 156/181, 247, 156/267, 305, 307.4, 307.7

(56) References Cited

U.S. PATENT DOCUMENTS

| | | |
|---|---|---|
| 3,932,247 A | 1/1976 | Oshima |
| 4,006,540 A | 2/1977 | Lemelson |
| 4,883,554 A | 11/1989 | Bida |
| 4,952,462 A | 8/1990 | Bright |
| 5,573,501 A | 11/1996 | Ruscito et al. |

FOREIGN PATENT DOCUMENTS

| | | |
|---|---|---|
| CH | 679138 | 12/1991 |
| GB | 2151906 | 7/1985 |
| JP | 5269007 | 10/1993 |

OTHER PUBLICATIONS

Suzuki, Patent Abstracts of Japan, 05269007 (Oct. 19, 1993).

*Primary Examiner*—Sam Chuan Yao
(74) *Attorney, Agent, or Firm*—Birch, Stewart, Kolasch & Birch, LLP

(57) ABSTRACT

Method for manufacturing trophies, medals, award plates, indicative plates, panels, and the like, starting from laminates produced on bases having planar, spherical, cylindrical, or other geometric form. The laminates are manufactured with thermosetting resins reinforced with fiberglass, and the laminate production process includes an optimized sequence of preferably manual steps. The fiberglass used can be, for instance, chopped strand mat, woven roving, or fabric. Decorative designs that can be in the form of a transparency, paper, cloth, plastic, wood, metal, leather, or other material, and that can contain characters, drawings, paintings, illustration, pictures, signatures, etc., are inserted into the laminates. The decorative designs can be generated by computer, hand made, or otherwise produced. The laminates constitute inviolable casings that maintain the decorative designs isolated inside thereof. The laminates are cut out, glued, riveted, or otherwise mounted to provide trophies, medals, award plates, indicative plates, panels, and the like.

7 Claims, No Drawings

PROCESS OF MANUFACTURING TROPHIES, MEDALS AND AWARD PLATES, MADE OF POLYESTER, ESTERVINYLIC OR EPOXY RESINS, REINFORCED WITH FIBERGLASS

This application is the national phase under 35 U.S.C. § 371 of PCT International Application No. PCT/BR98/00113 which has an International filing date of Dec. 14, 1998, which designated the United States of America.

The present patent refers to the process of manufacturing the laminate in plain, spherical, cylindrical or another geometrical form, that is useful as basic raw material to manufacturate trophies, medals, award plates, indicative plates, panels, et al; being obtained by means of the insertion of polychromies containing characters, pictures, photographies, graphs, signatures, et al; made in transparencies, papers, cloths, plastics, wood, metals, leather, et al; generated by computer, manually, or by any other kind of printing; in the lamination of polyester, estervinylic or epoxy resins, reinforced with fiberglass.

The polyester, estervinylic or epoxy resins, reinforced with fiberglass, have nowadays too many applications in industries. Because they provide high mechanical properties, lightness, high dieletrical rigidness, dimensional stability, corrosion resistence, an simple molds with low maintenance cost, these fiberglass reinforced resins are applicated basically in: general structures, automotive, bodywork, boats, surfboards, tables, chairs, water containers, tanks, vans, automotive and industrial parts, et al. However, it's noticed that, given the versatility of these resins and the easiness to manufacturing them by the mold process, even by manually lamination, hand-held gun lamination, rolling, pultrusion, injection molding, presses, RTM, et al, the objective of their use has been: after the cure or polymerization of the resin, to get a piece in its final dimension, in other words, a finished piece. To improve the visual finishing of this piece, normally are used the resin pigmentation processes or even the traditional superficial painting. In special cases, by means of rolling process, tubes and cylinders are produced which once manufactored shall produce wads for application in machines. In the field of art manufacturing, it's noticed some utilization of the pure resin, without fiberglass reinforcement, applicated as superficial finishing in pieces like jewelleries, et al, nevertheless without insertion of these objects inside the resin.

With the purpose of enlarging the utilization field of the polyester, estervinylic or epoxy resins, reinforced with fiberglass, nor for the obtention of a final product after the polymerization of the resin, neither to obtain a simple superficial finishing, but to obtain a inviolately involucre of resin and fiberglass in polychromies, from which there will be manufacturated products like trophies, medals, award plates, indicative plates, panels, et al, it was developed the present manufacturing process. By means of insertion of polychromies in transparencies, papers, cloths, plastics, wood, metals, leather, et al; containing characters, drawings, paintings, pictures, photographies, signatures, et al; generated by computer, manually or by. any other kind of printing; in the lamination of polyester, estervinylic or epoxy resins, reinforced with fiberglass are obtained plates in plain; spherical, cylindrical or any other geometrical form that, cut out, glued, rivetted or assembled will originate trophies, medals, award plates, indicative plates, panels, et al.

The process in question consists on the following stages: (a) cleaning of the glassy surface or polished base, that must be totally. dried, (b) application of a organic alchool in four or five transverse layers, (c) drying of the surface, (d) initial application of a first catalysed resin layer over the dried alchool layer, (e) a wait for the attaining touch point, (f) application of two other catalysed resin layers, (g) placing the fiberglass in woven forms, textile forms, or roving forms, roulletting it until when the fiberglass is totally absorbed by the resin and there are no more airbubbles, (h) placing the polychromies with their faces turned to the base, (i) application of another catalysed resin layer, spreading it well, (0) placing the cloth on the plate and the polychromies, (k) new application of a catalysed resin layer, (l) placing the fiberglass in woven forms, textile forms, or roving forms, (m) placing the plastic film, stret alhed and pressed on the laminate, (n) roulletting the laminate with a cylinder or pipe, from center to border, until expelling all airbubbles, (o) allow the joint to polymerize for, at least, twenty-four hours and, finally, dismold, cut out and finish the pieces.

The present manufacturing process can be better understood through the detailing below, where will be taken, just as an example, and without any limitative character, the insertion of a transparency with polychromies in a plain laminate of polyester resin with woven forms fiberglass application.

Raw materials: polyester resin, reference (#) 10203, from Resana; polyvinylic alchool; woven forms 300 g/m$^2$ fiberglass; MEK M-50 catalyser; styrenics monomer; white microfiber peach skin twill cloth; cellophane film.

Mixtures to be done: mix up the polyvinylic alchool with water, at 50%; put 4,5% of the styrenics in the polyester resin and mix it up; at the moment of its usage, put 0,7% of MEK M-50 catalyser to the polyester resin, mixing it up quite well.

Process Detailing

On the well cleaned and dried glass or polished base, apply the polyvinylic alchool, in four or five transverse layers, using nylon sponge. Allow it to dry naturally in a 60° C. stewpot for 30 minutes, verifying if the surface does not have faults. On the polyvinylic alchool, apply a first layer of catalysed resin at the rate of 400 ml/m$^2$. A wait about 1.5 hour until this layer attains the touch point, in other words, until this layer is sticky, but not clinging to fingers. When it is at the touch point, apply a layer of catalysed polyester resin using a brush, at the rate of 150 ml/m$^2$. Brush it over quite well in all directions. Afterwards, scatter a layer of catalysed resin at the rate of 1600 ml/m$^2$ on the glass or polished base. Place the woven forms 300 g/m$^2$ fiberglass on the resin and roulette it using a specific roulette for lamination, until the resin absorb totally the woven forms 300 g/m$^2$ fiberglass and there are not airbubbles anymore. Place the transparency with polychromies faced to the base. The transparency must to be cut off pretty close to the polychromies. On the polychromies, place a layer of catalysed resin at the rate of 400 ml/m$^2$, spreading it well. Place the white microfiber peach skin twill cloth on the plate and the transparency. On the cloth, place a catalysed resin layer at the rate of 600 ml/m$^2$, spreading it well. Place the woven forms 300 g/m$^2$ fiberglass on the cloth, roulletting it until there are no more airbubbles. Add more catalysed resin, if necessary, in order that all the joint becomes well moist. Over the joint, place the cellophane film, stret alhed and pressed on the laminate. Using a cylinder or a +e,fra 3/4+ee" plastic pipe, roulette from center to borders, aiming to remove all air still existing inside the joint, All this process can not last more than 10/12 minutes. Let product polymerizing for 24 hours. After this time, dismold the plate from the glass or base. Cut out the pieces, leaving a plate margin over the boundaries of the transparency. Finish the edges with sandpaper and automotive wax and assemble what will be a trophy, medal, award plate, indicative plate or panel.

What is claimed is:

1. A process for manufacturing a decorative laminate for use in making trophies, medals, plates, or panels, said process comprising the steps of (a) providing, cleaning, and drying a smooth base, (b) applying 4 or 5 layers of a polyvinyl alcohol thereto, (c) drying the polyvinyl alcohol layers to form a release layer on top of the base, (d) applying a catalyzed resin layer comprising a polyester, vinyl ester, or epoxy resin onto said release layer, (e) allowing the catalyzed organic resin layer to dry to a state of tackiness which is a touch point, (f) applying 2 further layers of catalyzed organic resin on the tacky layer formed in step (e), (g) placing fiberglass in the form of chopped strand mat, woven roving, or fabric onto the layers of catalyzed organic resin applied in step (f) and rolling the fiberglass chopped strand mat, woven roving, or fabric into the resin layers until the fiberglass is totally absorbed by the resin and there are no air bubbles in the fiberglass-containing resin layer formed by this procedure, (h) placing a decorative design face down onto the fiberglass-containing resin layer, (i) applying a further layer of catalyzed organic resin on top of the layer formed in step (h), (j) placing a cloth on top of the layer formed in step (i), (k) applying a further layer of catalyzed organic resin on top of the layer formed in step (j), (l) placing fiberglass in the form of chopped strand mat, woven roving, or fabric onto the layer of catalyzed organic resin applied in step (k) and rolling the fiberglass fabric into the resin layer, (m) placing a plastic film on top of the layer formed in step (l) to form a laminate, (n) rolling the thus-formed laminate with a cylinder or pipe until all air bubbles are expelled, (o) allowing the catalyzed organic resin layers to polymerize for at least 24 hours, and (p) releasing the laminate consisting of all of the materials applied subsequent to step (c), trimming said laminate to frame the decorative design of step (h), and finishing the trimmed piece encompassing the decorative design.

2. The process of claim 1, wherein the decorative design is on a transparency, paper, cloth, plastic wood, metal, or leather, and wherein the decorative design contains characters, pictures, photographs, graphs, or signatures, and wherein the decorative design was generated by computer, by hand, or by another kind of printing.

3. The process of claim 1, wherein step (h) is immediately followed by step (j).

4. The process of claim 1, wherein steps (m) and (n) impart a smooth finish to the laminate.

5. The process of claim 1, wherein the trimming substep of step (p) produces a planar, spherical, or cylindrical form, and wherein the finishing substep of step (p) produces a trophy, medal, award plate, sign plate, or panel.

6. The process of claim 1, wherein a first layer of catalyzed resin (d) is polymerized to touch point (e) before the application of additional layers.

7. A process of manufacturing trophies, medals, or award plates from polyester, estervinylic, or epoxy resins, comprising:

applying an organic alcohol in four or five transverse layers;

drying the alcohol layers;

applying a first catalyzed resin layer on the dried alcohol layer;

allowing the resin layer to become tacky;

applying second and third catalyzed resin layers;

placing fiberglass in textile or roving form into the resin and roulleting the fiberglass until the fiberglass is totally absorbed by the resin and there are no more air bubbles;

placing a decorative object face down onto the impregnated fiberglass;

applying a fourth catalyzed resin layer;

placing another layer of fiberglass in textile or roving form onto the fourth resin layer and roulleting the fiberglass layer;

placing a plastic film on the laminate;

roulleting the laminate until all air bubbles are expelled;

allowing the resin layers to polymerize for at least twenty-four hours; and dismolding and cutting the finished pieces.

* * * * *